(12) United States Patent
Fan et al.

(10) Patent No.: US 8,445,089 B1
(45) Date of Patent: May 21, 2013

(54) POLYOXYMETHYLENE MODIFIED WITH IMIDIZED ACRYLIC RESINS

(75) Inventors: Xiyun (Serene) Fan, Newark, DE (US); Ramabhadra Ratnagiri, Wilmington, DE (US)

(73) Assignee: E I du Pont de Nemours and Company, Wilmington, DE (US)

( * ) Notice: Subject to any disclaimer, the term of this patent is extended or adjusted under 35 U.S.C. 154(b) by 63 days.

(21) Appl. No.: 13/306,757

(22) Filed: Nov. 29, 2011

(51) Int. Cl.
*B29D 22/00* (2006.01)
*B29D 23/00* (2006.01)
*B32B 1/08* (2006.01)

(52) U.S. Cl.
USPC ...... 428/35.7; 428/36.9; 428/36.92; 428/515; 428/522; 264/460; 264/109; 264/126; 525/181

(58) Field of Classification Search
USPC ..... 428/35.7, 36.9, 36.92, 515, 522; 264/460, 264/109, 126; 525/181
See application file for complete search history.

(56) References Cited

U.S. PATENT DOCUMENTS

| | | |
|---|---|---|
| 3,146,209 A | 8/1964 | Graves |
| 3,284,425 A | 11/1966 | Schroder |
| 4,098,843 A | 7/1978 | Johnson |
| 4,098,984 A | 7/1978 | Turner |
| 4,169,924 A | 10/1979 | Barabas |
| 4,217,424 A | 8/1980 | Weese |
| 4,246,374 A | 1/1981 | Kopchik |
| 4,255,322 A | 3/1981 | Kopchik |
| 4,415,706 A | 11/1983 | Staas |
| 4,518,717 A | 5/1985 | Long |
| 4,595,727 A | 6/1986 | Doak |
| 4,727,117 A | 2/1988 | Hallden-Abberton |
| 4,766,168 A | 8/1988 | West |
| 4,814,397 A | 3/1989 | Novak |
| 4,874,817 A | 10/1989 | Inskip |
| 4,954,574 A | 9/1990 | Hallden-Abberton |
| 5,004,777 A | 4/1991 | Hallden-Abberton |
| 5,011,890 A | 4/1991 | Novak |
| 5,063,263 A | 11/1991 | Hayes |
| 5,110,877 A | 5/1992 | Hayes |
| 5,264,483 A | 11/1993 | Hallden-Abberton |
| 5,318,813 A | 6/1994 | Flexman, Jr. |
| 5,502,111 A | 3/1996 | Hyynh-Ba |
| 5,548,033 A | 8/1996 | Vetter |
| 2007/0055017 A1 | 3/2007 | Schultes |

FOREIGN PATENT DOCUMENTS

| | | |
|---|---|---|
| DE | 4132638 | 4/1993 |
| EP | 0 424 755 | 7/1996 |

OTHER PUBLICATIONS

Patent Abstracts of Japan, Publication No. 02-015585, Jan. 19, 1991, Fujitsu Ltd.

*Primary Examiner* — Michael C Miggins
(74) *Attorney, Agent, or Firm* — Loretta Smith; Richard Brown

(57) ABSTRACT

Described herein are compositions comprising (a) 92 to 99 weight percent, of polyoxymethylene with number average molecular weight from 65,000 to 250,000 g/mole; and (b) 1 to 8 weight percent of an imidized acrylic resin obtained by treating an acrylic polymer with a monoalkyl amine, wherein the weight percents of a and b are based on their combined weight, and monoalkyl group has from one to five carbon atoms, the degree of imidization is 20% to 100% and the acid level is from 0 to about 2 weight percent of the imidized acrylic resin. The composition has significantly higher heat deflection temperature than the neat polyoxymethylene.
Processes of increasing heat deflection temperature of POM compositions are described herein by blending (a) and (b), wherein the resultant melt-mixed composition has a 200% increase or greater in time to 5% creep strain relative to the same melt-mixed composition lacking (b).

20 Claims, No Drawings

POLYOXYMETHYLENE MODIFIED WITH IMIDIZED ACRYLIC RESINS

OVERVIEW

This invention relates to use of imidized acrylic resins as modifiers of polyoxymethylene for improving its high temperature properties.

Polyoxymethylene [POM] compositions comprise homopolymers of formaldehyde or cyclic oligomers of formaldehyde such as trioxane, and/or copolymers of formaldehyde or cyclic oligomers of formaldehyde. POM homopolymers have the terminal groups end-capped by esterification or etherification. In POM copolymers, the oxyalkylene groups have at least two adjacent carbon atoms in the main chain and the terminal groups can be hydroxyl terminated or end-capped by esterification or etherification. The proportion of the comonomers can be up to 20 weight percent.

POM compositions with relatively high molecular weight POM, i.e., between 50,000 and 100,000, may be used to prepare articles by any of the techniques commonly used with thermoplastic materials, e.g., compression molding, injection molding, extrusion, blow molding, melt spinning, stamping and thermoforming. Articles made from such relatively high molecular weight POM compositions possess desired physical properties, such as stiffness, strength, toughness, dimensional stability and solvent resistance.

POM compositions are commercially available from DuPont under the Delrin® trade name and used in the automotive, industrial, electronic, and consumer goods industries.

Unmodified POM has a heat deflection temperature [HDT] of around 97° C. to 100° C. and a flex modulus around 3000 Megapascals [MPa]. For many engineering applications these two properties are not high enough. A conventional method to increase stiffness and the HDT of POM has been to add glass fiber. Although increasing HDT, the addition of glass fiber increases weight, promotes poor surface appearance, molding difficulties and anisotropic properties such as shrinkage, and decreases toughness.

U.S. Pat. Nos. 2,146,209; 3,284,425; 4,169,924 and 4,246,374 disclose polyglutarimides, also known as imidized acrylic polymers or imides of polyacrylic acids. U.S. Pat. Nos. 4,246,374 and 4,217,424 describe combining imidized acrylic polymers with other materials, such as impact modifiers, pigments, fibers, stabilizers, lubricants etc. U.S. Pat. Nos. 4,255,322; 4,595,727 and 5,502,111 disclose blends of PVC with polyglutarimides having improved heat deflection temperatures.

Imidized acrylic resins have been used to modify polyamides to improve their melt flow, melt strength, tensile strength, and modulus. Compatible polymer blends of polyamides and imidized acrylic resins possess improved impact resistance and ductility compared with neat imidized acrylic resins. The addition of high service temperature imidized acrylic resins to a lower service temperature nylon results in improved service temperature for the nylon. Compatible polymer blends of imidized acrylic resins with nylons and conventional impact modifiers exhibit an improved impact response over the imidized acrylic resin modified with an equal amount of the conventional impact modifier (see U.S. Pat. Nos. 4,415,706 and 4,874,817).

Imidized acrylic acid resins have been blended with compositions comprising POM and thermoplastic polyurethane to provide improved mold shrinkage while still maintaining a useful balance of properties, such as stiffness, elongation, and toughness (see U.S. Pat. No. 5,318,813 and European Pat. No. EP0424755). U.S. Pat. Nos. 4,727,117; 4,954,574; 5,004,777; and 5,264,483 disclose a 50/50 blend of POM with an imidized acrylic acid resin. Japanese Pat. App. Pub. No. JP1990-015585 discloses blends of polyglutarimides with polyacetal to provide impact resistance and fluidity while maintaining a thermal deformation temperature of the polyglutarimide. German Pat. App. No. DE4132638 discloses blends of POM with imidized acrylics.

It is desirable to develop polyoxymethylene compositions with increased heat deflection temperature, increased stiffness/modulus at room temperature and elevated temperatures below the melting point of the polyoxymethylene melting point, increased upper use temperature at a given stiffness and reduced long term creep at elevated temperatures. It is also desirable to develop compositions with these properties that have improved thermostability, the resistance to decomposition at elevated temperatures.

Described herein are thermoplastic compositions comprising, consisting essentially of, or prepared from:
(a) about 92 to about 99 weight percent, based on the combined weight of (a) and (b), of polyoxymethylene with number average molecular weight from 20,000 to 250,000 g/mole; and
(b) about 1 to about 8 weight percent, based on the combined weight of (a) and (b), of an imidized acrylic resin obtained by treating an acrylic polymer with a monoalkyl amine wherein the monoalkyl group has from one to five carbon atoms, the degree of imidization is 20% to 100% and the acid level is from 0 to about 2 weight percent of the imidized acrylic resin. Notably, the composition is substantially free of thermoplastic polyurethane.

Preferably, the imidized acrylic resin is obtained by treating polymethyl methacrylate with methyl amine. Preferably, the imidized acrylic resin is present in the composition in an amount from about 1 to about 5 weight percent.

Also described herein are articles comprising the composition described herein. The article has a heat deflection temperature determined according to ASTM D-648 that exceeds that of a comparison standard article wherein the shaped article and the comparison standard article have the same shape and structure with the exception that the comparison standard article is prepared from a polyoxymethylene composition that does not comprise an imidized acrylic resin.

Also described herein are methods for preparing a shaped article comprising a composition, the method comprising
(1) melt blending a first polyoxymethylene composition, wherein the first polyoxymethylene has a number average molecular weight from 20,000 to 250,000 g/mole, with an imidized acrylic resin, wherein the imidized acrylic resin is obtained by treating an acrylic polymer with a monoalkyl amine wherein the monoalkyl group has from one to five carbon atoms, the degree of imidization is 20% to 100% and the acid level is from 0 to about 2 weight percent of the imidized acrylic resin to provide a molten thermoplastic composition;
(2) forming the molten composition into a desired shape, and
(3) cooling the molten composition to provide a shaped article;
wherein the shaped article has a heat deflection temperature determined according to ASTM D-648 that exceeds that of a comparison standard article wherein the shaped article and the comparison standard article have the same shape and structure with the exception that the comparison standard article is prepared from the first polyoxymethylene composition that does not comprise an imidized acrylic resin.

Also described herein are processes of increasing heat deflection temperature, comprising:
melt-mixing
(a) 1 to 8 weight percent of an imidized acrylic resin having
an acid level and
a degree of imidization, and
obtained by treating an acrylic polymer with a monoalkyl amine having a monoalkyl group;
(b) 92 to 99 weight percent of polyoxymethylene with number average molecular weight from 50,000 to 250,000 g/mol, and
(c) optionally, one or more other additives,
to result in a melt-mixed composition,
wherein:
the weight percent of (a) and (b) is each based on the combined weight of (a) and (b),
the monoalkyl group has from one to five carbon atoms,
the degree of imidization is 20% to 100%,
the acid level is from 0 to about 2 weight percent of the imidized acrylic resin; and
the time to 5% creep strain of the melt-mixed composition, as determined by ISO899-1 is 200% or greater than that of the same composition lacking (a).

DETAILED DESCRIPTION OF THE INVENTION

Definitions and Abbreviations

The following definitions and abbreviations are to be used to interpret the meaning of the terms discussed in the description and recited in the claims.

As used herein, the article "a" indicates one as well as more than one and does not necessarily limit its referent noun to the singular.

As used herein, the terms "about" and "at or about" refers to that an amount/value in question may be the value designated or some other value that is approximately or about the same. The term is intended to convey that similar values promote equivalent results or effects recited in the claims.

As used herein, the terms "comprises," "comprising," "includes," "including," "has," "having", "consisting essentially of", and "consisting of" or any other variation of these, may refer either to a non-exclusive inclusion or to an exclusive inclusion. When these terms refer to a non-exclusive inclusion, a process, method, article, or apparatus that comprises a list of elements is not limited to the listed elements but may include other elements not expressly listed or which may be inherent. Further, unless expressly stated to the contrary, "or" refers to an inclusive, not an exclusive, or. For example, a condition A or B is satisfied by any one of the following: A is true (or present) and B is false (or not present), A is false (or not present) and B is true (or present), and both A and B are true (or present).

When these terms refer to a more exclusive inclusion, these terms limit the scope of a claim to those recited materials or steps that materially affect the novel elements of the recited invention.

When these terms refer to a wholly exclusive inclusion, these terms exclude any element, step or component not expressly recited in the claim.

As used herein, the term "article" refers to an unfinished or finished item, thing, object, or an element or feature of an unfinished or finished item, thing or object. As used herein, when an article is unfinished, the term "article" may refer to any item, thing, object, element, device, etc. that will be included in a finished article and/or will undergo further processing in order to become a finished article. As used herein, when an article is finished, the term "article" refers to an item, thing, object, element, device, etc. that has undergone processing to completion to thereby be suitable for a particular use/purpose.

An article may comprise one or more element(s) or subassembly(ies) that either are partially finished and awaiting further processing or assembly with other elements/subassemblies that together will comprise a finished article. In addition, as used herein, the term "article" may refer to a system or configuration of articles.

As used herein, terms that describe molecules or polymers follow the terminology in the *IUPAC Compendium of Chemical Terminology* version 2.15 (International Union of Pure and Applied Chemistry) of Sep. 7, 2009.

As used herein, the term "additive" refers to additional components added to the polyoxymethylene compositions described herein, which are different from the imidized acrylic resin described herein.

Unless stated otherwise, all percentages, parts, ratios, and like amounts, are defined by weight.

As used herein, the terms "known to those of skill in the art", "conventional" or a synonymous word or phrase refer to a description that signifies that materials, methods, and machinery are in conventional practice or are known or that a skilled artisan would recognize as known at the time of filing the present application.

As used herein, the term "polymer" refers to a macromolecule or a collection of macromolecules differing only in the number of repeating units, including an oligomer, homopolymer, or copolymer.

As used herein, the term "copolymer" refers to polymers comprising copolymerized units resulting from copolymerization of more than one comonomer. A copolymer may be described herein by its constituent comonomers or by the amounts of its constituent comonomers, for example "a copolymer comprising ethylene and 18 weight percent of acrylic acid", etc. Such a description of a copolymer indicates that the copolymer contains copolymerized units (in the specified amounts when specified) of the specified comonomers. The term "terpolymer" refers to polymers consisting essentially of three monomers.

As used herein, the terms "polyoxymethylene", abbreviated as POM, "polyoxymethylene polymer" and "polyacetal polymer" refer to one or more homopolymers, copolymers, and mixtures of these, having a repeating unit of .CH$_2$O. The terminal groups of these polymers are derived by initiating, terminating, or chain-transferring groups, such as water or alcohols, or by chemical reaction, such as that resulting in ester or ether groups, including acetate, acetyl, methyl and methoxy groups.

As used herein, the terms "imidized acrylic polymer", "polyglutarimide", and "imidized acrylic" may be used interchangeably and refer to the following chemical structure:

Structure I: Imidized Acrylate or Methacrylate Polymer:

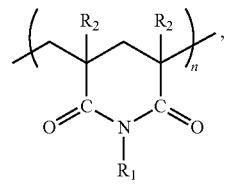

wherein $R_1$ is a $C_1$ to $C_5$ alkyl; and
$R_2$ is H or $CH_3$.

Structure II: Imidized Methacrylate Polymer

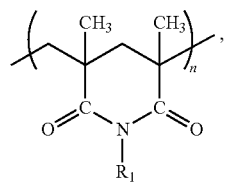

wherein $R_1$ is a $C_1$ to $C_5$ alkyl.

As used herein, the term "high acid imidized acrylic [IA] refers to an IA having an acid weight percent of 5 or greater As used herein, the term "low acid IA" refers to an IA having an acid weight percent of 4 or less, preferably less than 1 weight percent.

As used herein, the term "weight average molecular weight" is abbreviated to $M_w$ or Mw. As used herein, the term "number average molecular weight" is abbreviated to $M_n$ or Mn.

As used herein, the terms "polymer melt mass flow rate", "melt flow rate" or "melt flow index", abbreviated as "MFR" or as "MFI", refer to a measure of the ease of flow of a thermoplastic polymer melt, which includes a polymer composition melt. It is defined as the mass of polymer, in grams, flowing in ten minutes through a capillary of a specific diameter and length by a pressure applied via prescribed alternative gravimetric weights at alternative prescribed temperatures. The method is described in the standard ASTM D1238-04c. The polymer melt mass flow rate is reported in units of grams per 10 minutes, and carried out at condition 190° C./2.16 kg, unless otherwise specified.

Melt flow rate is an indirect measure of molecular weight, with high melt flow rate corresponding to low molecular weight. At the same time, melt flow rate is a measure of the ability of the melted material to flow under pressure. Melt flow rate is inversely proportional to viscosity of the melt at the conditions of the test, though it should be borne in mind that the viscosity for any such material depends on the applied force. Ratios of two melt flow rate values for one material at different gravimetric weights are often used as a measure of the breadth of the molecular weight distribution.

As used herein, the term "acrylic resin" refers to a polymer of an acrylate ester (an alkyl acrylate), or a methacrylate ester (an alkyl methacrylate), or any combination of these.

As used herein, the term "substantially free of thermoplastic polyurethane" refers to less than 1 weight percent, preferably less than 0.5 weight percent of thermoplastic polyurethane in the composition.

As used herein, the terms "heat deflection temperature", "heat distortion temperature", abbreviated as HDT herein, refer to that temperature at which a polymer or plastic sample deforms under a specified load.

As used herein, the term "degree of imidization" of the imidized acrylic resins described herein refers to the molar amount of the ester groups reacted with the amine to form the cyclic imide moiety. This term is also described in terms of weight percent of the cyclic imide group in the resulting copolymer.

As used herein, the terms "creep resistance", "creep deformation" and "time to X % creep strain" refer to the same or equivalent property, which is a measure of a material's ability to resist creep. Specifically, creep is that tendency of a solid material to slowly move or deform permanently under the influence of stresses and occurs as a result of long term exposure to high levels of stress that are below the yield strength of the material. Creep is more severe in materials subjected to heat for long periods, and near melting point as creep always increases with temperature.

Thus, the term "time to X % creep strain" is a measure of the duration it takes for the material to experience an X %, such as 5% or 7%, creep strain and as such measures the creep strain rate in the secondary or steady state creep stage.

As used herein, the term "storage modulus E'" refers to the elastic component of the modulus of the material as opposed to the viscous component.

As used herein, the terms "MPa", "mPA", "mPa" refer to megapascal or Megapascal, a measure of pressure. As used herein, the terms "kPa", "kPA", kPa" refer to kilopascal or Kilopascal.

As used herein, the symbol "%" refers to percent. As used herein, the terms "in", "m", "cm" refer to inch, meter, and centimeter, respectively.

As used herein, the terms "hr", "min", "sec" refer to hour, minute and second, respectively.

As used herein, the terms "lb", "oz", "gm", "kg" refer to pound, ounce, gram and kilogram.

As used herein, the term "CHN analyzer" refers to that instrument which determines the elemental composition of a sample and derives its name from the three primary elements measured by the device: carbon (C), hydrogen (H) and nitrogen (N). Sulfur (S) and oxygen (O) may also be measured.

As used herein, the term "Std. Dev." refers to Standard Deviation.

Ranges

Any range set forth herein expressly includes its endpoints unless explicitly stated otherwise. Setting forth an amount, concentration, or other value or parameter as a range specifically discloses all ranges formed from any pair of any upper range limit and any lower range limit, regardless of whether such pairs are separately disclosed herein. The processes and articles described herein are not limited to the specific values disclosed in defining a range in the description.

Preferred Variants

The disclosure herein of any variants in terms of materials, methods, steps, values, and/or ranges, etc.—whether identified as preferred variants or not—of the processes, compositions and articles described herein is specifically intended to disclose any process and article that includes ANY combination of such materials, methods, steps, values, ranges, etc. For the purposes of providing photographic and sufficient support for the claims, any such disclosed combination is specifically intended to be a preferred variant of the processes, compositions, and articles described herein.

Generally

Described herein are POM compositions comprising imidized acrylic polymers (IA). Also described are processes of improving creep resistance of relatively high weight POM compositions, i.e., having Mn of 50,000 to 250,000, by adding low acid imidized acrylic polymers.

These compositions and processes possess improved heat resistance properties such as increased heat deflection temperature, increased Vicat temperature, increased stiffness/modulus at room temperature and elevated temperatures below the melting point of the POM, and increased upper use temperature at a given stiffness. Since the IA has a much higher glass transition temperature than the polyoxymethylene, the blend of IA and the polyoxymethylene improves the heat resistance and other mechanical properties of the POM composition, such as tensile strength and thermoplastic processability. Surprisingly, the benefits of improved heat deflection temperature and increased stiffness/modulus are achieved using very low levels of IA.

Polyoxymethylene ["POM"]

The polyoxymethylenes in the compositions described herein include homopolymers of formaldehyde or of cyclic oligomers of formaldehyde, the terminal groups of which are end-capped by esterification or etherification, and copolymers of formaldehyde or of cyclic oligomers of formaldehyde and other monomers that yield oxyalkylene groups with at least two adjacent carbon atoms in the main chain, the terminal groups of which copolymers can be hydroxyl terminated or can be end-capped by esterification or etherification.

Polyoxymethylenes may be branched or linear and generally have a number average molecular weight (Mn) in the range of 20,000 to 250,000 g/mole. The POM useful in the compositions described herein exhibit Mn of 50,000 to 100,000, and more preferably 50,000 to 80,000. Particularly preferred are polyoxymethylenes with number average molecular weight of about 65,000. The weight average molecular weight (Mw) of POM used in the blends may be from 50,000 to about 150,000 g/mole, preferably from 100,000 to 150,000 g/mole.

The molecular weight may be conveniently measured by gel permeation chromatography in m-cresol at 160° C. using a bimodal column kit with nominal pore size of 60 and 1000 angstrom [Å].

As an alternative to number average molecular weight, melt flow rate may also characterize the POMs used herein. Polyoxymethylenes suitable in the compositions described herein have a melt flow rate of from 0.1 to 40 grams/10 minutes, as measured according to ASTM-D-1238, Procedure A, at 190° C. using a 2.16 kg weight. Preferably, the POMs in the compositions described herein have a melt flow rate of from 0.5 to 35 grams/10 minutes. More preferably, the POMs used herein are linear, with a melt flow rate of about 1 to 20 gram/10 minutes. Particularly preferred are POMs with a melt flow rate of about 1 to 5 gram/10 minutes or of about 10 to 20 gram/10 minutes.

The POMs in the compositions described herein may be homopolymer, copolymer, or a mixture of these. POM homopolymer is preferred because of its greater stiffness and strength. Preferred polyoxymethylene homopolymers include those whose terminal hydroxyl groups have been end-capped by a chemical reaction to form ester or ether groups, preferably acetate or methoxy groups, respectively. U.S. Pat. No. 2,998,409 describes a preparation process of acetate end-capped POM homopolymers.

POM copolymers can contain one or more comonomers generally used in preparing POM compositions. More commonly used comonomers include alkylene oxides of 2 to 12 carbon atoms and their cyclic addition products with formaldehyde. The quantity of comonomer in the compositions described herein is not more than 20 weight percent, preferably not more than 15 weight percent, and most preferably about 2 weight percent. The most preferred comonomer is ethylene oxide.

The POM compositions described herein may contain those additives, ingredients, and modifiers generally known to be added to polyoxymethylene, for example stabilizers and antioxidants.

Imidized Acrylic Resins

Imidized acrylic polymers have the following chemical structure and formula:

Structure I: Imidized Acrylate or Methacrylate Polymer:

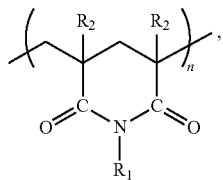

wherein $R_1$ is a $C_1$ to $C_5$ alkyl; and
$R_2$ is H or $CH_3$.

Structure II: Imidized Methacrylate Polymer

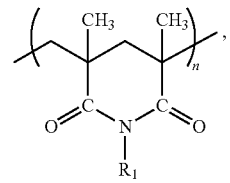

wherein $R_1$ is a $C_1$ to $C_5$ alkyl.

See e.g., U.S. Pat. Nos. 3,284,425; 4,246,374; 4,518,717; 4,727,117 and 5,110,877.

Notably, imidized acrylic resins comprise cyclic imide units. Imidized acrylic polymers may be prepared by reacting ammonia or a primary amine with an acrylate or methacrylate ester homo- or co-polymer, such as poly(methyl methacrylate), which results in cyclic imide groups from the condensation of the amine with two adjacent ester groups on the acrylic polymer. The molar amount of the ester groups reacted with the amine to form the cyclic imide moiety is referred to as the degree of imidization, which may also be described in terms of weight percent of the cyclic imide group in the resulting copolymer.

The preferred primary amine used in treating the acrylic polymer in the imidization reaction above is methylamine, but higher aliphatic amines may be used. Other amines include, for example, ethylamine, isopropylamine, and butylamine.

The acrylic polymer may be poly(methyl methacrylate) or poly(methyl acrylate), preferably poly(methyl methacrylate).

Other polymethacrylates or polyacrylates copolymers may be used instead of poly(methyl methacrylate) but may be less desirable because of their lower glass transition temperature [Tg]. These polymers may have, besides the methacrylate or acrylate monomer, smaller amounts of additional, ethylenically unsaturated comonomers copolymerized with them. Such additional monomers may be, for example, styrene, acrylonitrile, vinyl acetate, ethylene, butadiene and methyl vinyl ether. When used to prepare the imidized acrylate, copolymers of methyl methacrylate or methyl acrylate and at least one additional comonomer selected from styrene, acrylonitrile, vinyl acetate, ethylene, butadiene or methyl vinyl ether preferably contain at least about 40 weight percent, preferably at least 60 weight percent, and more preferably at least 80 weight percent of methacrylate or acrylate units.

Suitable imidized polymers include imidized poly(methyl methacrylate) or poly(methyl acrylate), imidized copolymers of either methyl methacrylate or methyl acrylate and comonomers such as those listed above, preferably in which poly(methyl methacrylate) is reacted with methyl amine. Different from the molecular weight—typically from 100,000 to 200,000—and the degree of imidization-20 to 60%—of the imidized acrylic resins in PVC blends of U.S. Pat. No. 4,255,322, the compositions described herein have imidized acrylic resins with a preferred molecular weight from 20,000 to 200,000, and a degree of imidization from 20 to 100%, preferably 60 to 100%, more preferably 80 to 100%, most preferably from 90 to 100%.

The imidized acrylic polymers described herein, depending on the degree of imidization of the starting polymer, may contain varying amounts of unconverted ester groups, carboxylic groups, and end-capped carboxylic groups. Anhydride and acid groups are formed on the polymer chain as a byproduct of imidization of (meth)acrylic polymers by reaction with ammonia or primary aminesand are reported to be intermediate in the formation of imide units. As the degree of imidization exceeds 95% and approaches 100%, the amount of acid and anhydride units present on the resultant imidized product decreases. When the degree of imidization of an imidized acrylic polymer described herein is 95% or less, the amount of acid and anhydride functionality present on the polymer chain as a typical result of the reaction may be undesired for its general, adverse effect on the properties of the polyimide. For example, the acid and anhydride functionality on an imidized polymer described herein may alter the miscibility of the polymer with other thermoplastic polymers.

Reducing the number of acid and anhydride groups on the imidized acrylic polymer is known and discussed in, e.g., U.S. Pat. Nos. 4,727,117; 4,954,574; 5,004,777; 5,110,877; 5,264,483; and 5,548,033 and U.S. Pat. App. Pub. No. 2007/0055017. U.S. Pat. No. 4,727,117 discloses a process in which the residual acid and anhydride groups are treated with agents capable of converting them to non-acid or non-anhydride groups and incapable of reacting with imide units. These agents include alkylating agents and esterification agents, such as trialkyl othoformates or dimethyl carbonate. The acid level, as indicated by the weight percent of the acid groups (such as methacrylic acid units) present in the polymer is from 0 to 10 weight percent preferably from 0 to 2 weight percent.

Rohm and Haas Company (Philadelphia, Pa.) previously offered several imidized acrylic resins, including PARALOID® HT-510 grade for blending with PVC and PARALOID® EXL-4000 grades, a family of resins having higher glass transition temperature (Tg), for blending with other engineering resins. Depending upon the degree of imidization of the starting acrylic polymer, the Tg of the imidized acrylic resin varies and increases as the degree of imidization increases. PARALOID® HT-510 has a fairly low Tg, about 130° C. The PARALOID® EXL-4000 family has reported Tg values of from 140° C. to 170° C. The PARALOID® resins have been blended with nylon 6, polycarbonates, acrylonitrile/styrene/butadiene and styrene/acrylonitrile resins, and poly(ethylene terephthalate) to increase the heat resistance or melt strength of the resulting compositions and to improve optical properties, or to serve as carriers for pigments and other additives.

The PARALOID® EXL-4000 grade resins may have from less than 1 to about 10 percent of carboxylic groups; some may also contain a small amount of anhydride groups. As discussed above, carboxylic groups apparently are formed during the imidization reaction and probably cannot be avoided. However, some grades of these resins have those carboxylic groups capped, presumably, by esterification.

Additives

The compositions described herein may include, besides the POM and the imidized acrylic polymer, other additives, modifiers, and ingredients as are generally used in the polymer art, including stabilizers and co-stabilizers, such as those disclosed in U.S. Pat. Nos. 3,960,984; 4,098,843; 4,766,168; 4,814,397; 5,011,890; and 5,063,263, antioxidants, pigments, colorants, UV stabilizers, toughening agents, nucleating agents, glass, minerals, lubricants, fibers, reinforcing agents, and fillers. Some pigments and colorants can adversely affect the stability of polyoxymethylene compositions but with little effect on their physical properties. Preferred thermal stabilizers are described in U.S. Pat. No. 5,011,890, with polyacrylamide being most preferred.

Processes of Increasing Heat Deflection Temperature

Increasing creep resistance informs on increasing the heat deflection temperatures of polyoxymethylenes. Increasing creep resistance depends on the addition of low acid IA. Thus, the addition of low acid IA improves creep resistance AND increases heat deflection temperature.

Heat Deflection Temperature of thermoplastics is measured by subjecting a rectangular specimen to a constant load while imposing a steadily increasing temperature. The temperature at which the deflection of beam loaded under flexion reaches a preset value is termed the Heat Deflection Temperature (HDT). The actual strains experienced by the sample under these test conditions are typically less than 1% and are flexural in nature. Increases in heat deflection temperature correspond to improved stiffness retention with temperature of the composition.

Improving stiffness is also required to improve creep resistance of POM compositions. Thus, it is the improvement in stiffness of the POM composition while subjected to a steadily increasing temperature that informs on both increases in heat deflection temperature and improvement in creep resistance.

Tensile creep measurements illustrated below were carried out at high temperatures and loads, 90° C. and 25 MPa. Reducing the deformation under these conditions corresponds to a better retention of stiffness that is similar to what is observed during measurement of the heat deflection temperature.

However, in contrast to HDT measurement, the creep resistance was measured here in the more severe tensile mode where the entire cross-section of the sample was exposed to the same load. In addition, the tests were carried out until the total accumulated strain reached at least 7%. This is a much larger strain than what is typically observed in HDT tests. Thus, the creep resistance measurements here reflect a more stringent test of stiffness retention and therefore inform more strongly on an increase of HDT for the compositions described herein.

The processes of increasing heat deflection temperature described herein comprise the step of melt-mixing
 (a) 1 to 8 weight percent of an imidized acrylic resin having
  an acid level and
  a degree of imidization, and
  obtained by treating an acrylic polymer with a monoalkyl amine having a monoalkyl group;
 (b) 92 to 99 weight percent of polyoxymethylene with number average molecular weight from 50,000 to 250,000 g/mol, and
 (c) optionally, one or more other additives,
to result in a melt-mixed composition,
wherein:
the weight percent of (a) and (b) is each based on the combined weight of (a) and (b),
the monoalkyl group has from one to five carbon atoms,
the degree of imidization is 20% to 100%,
the acid level is from 0 to about 2 weight percent of the imidized acrylic resin; and
the time to 5% creep strain of the melt-mixed composition, as determined by ISO899-1, is 200% or greater than that of the same composition lacking (a).

In addition to exhibiting a time to 5% creep stated in the previous paragraph, these processes may also exhibit a heat deflection temperature, determined by ISO-75 1/–2, of 20% or greater than that of the same composition lacking (a). Moreover, in any of the processes described herein, the imidized acrylic resin may comprise cyclic imide units and/or be present in the melt-mixed composition in an amount from 1 to 5 weight percent.

Moreover, in any of the processes described herein, the imidized acrylic resin may be obtained by treating with methylamine an acrylic polymer selected from the group consisting of:
poly(methyl methacrylate); poly(methyl acrylate); a copolymer of methyl acrylate and at least one additional comonomer selected from styrene, acrylonitrile, vinyl acetate, ethylene, butadiene or methyl vinyl ether; and a copolymer of methyl methacrylate and at least one additional comonomer selected from styrene, acrylonitrile, vinyl acetate, ethylene, butadiene or methyl vinyl ether. In these processes, the preferred acrylic polymer may be poly(methyl methacrylate) and/or the imidized acrylic resin may be obtained by treating with methylamine poly(methyl methacrylate).

Further, in any of these processes described herein, the polyoxymethylene has a number average molecular weight from 50,000 to 80,000 g/mole and may be selected from the group consisting of homopolymer, copolymer, and mixtures of these. Moreover, in any of these processes described herein, the degree of imidization may range from 60% to 100%, preferably from 80% to 100%, and more preferably from 90% to 100%.

Making the POM Compositions Described Herein

The POM compositions described herein are made preferably by tumbling or mixing together pellets, or similar article, of the individual components. Regardless of how mixed, the individual components should be melt blended by any mixing device capable of developing high shear in a range of temperatures that are both above the softening points of, and below the occurrence points of significant degradation of the polymer blend components. Examples of such devices include rubber mills, internal mixers such as "Banbury" and "Brabander" mixers, single or multi-blade internal mixers with a cavity heated externally or by friction, "Ko-kneaders", multi-barrel mixers such as "Farrell Continuous Mixers", injection molding machines, and extruders, both single screw and twin screw, either co-rotating or counter-rotating. These devices can be used alone or in combination with static mixers, mixing torpedoes and/or various devices to increase internal pressure and/or the intensity of mixing such as valves, gates, or screws designed for this purpose.

It is preferred to use a continuous mixing device to achieve intimate mixing of the blend components with the greatest efficiency, consistency and evenness. Extruders are the most convenient to use because of their high throughput, possible modular construction and ease of assembly, choice of many mixing screws, and ease of control and maintenance of process temperatures. Twin screw extruders, particularly those incorporating high intensity mixing sections such as reverse pitch elements and kneading elements, are especially preferred.

Articles Comprising the POM Compositions Described Herein

Shaped articles comprising the POM compositions described herein may be made by any of several common methods, including compression molding, injection molding, extrusion, blow molding, melt spinning, film forming including cast film or blown film techniques, and thermoforming. Injection molding is especially useful. Examples of shaped articles include sheet, profiles, rod stock, film, filaments, fibers, strapping, tape, tubing, pipe and articles of complex shape such as machine or engine parts. Such shaped articles can be treated by orientation, stretching, coating, annealing, painting, laminating and plating after their initial shaping. Because the blends are thermoplastic, articles can be ground and remolded.

Since the POM compositions described herein have increased upper use temperature and can resist creep without sagging at higher temperatures compared to neat POM, they can be used to make parts, such as gears, especially for automotive applications in which the gears are regularly exposed to higher temperature, electronic devices, and in those applications where a high ductility retention and good thermostability are desired. Other especially useful applications include parts for conveyor systems that handle food, wrapped or unwrapped ingestible products, nutriceuticals, pharmaceuticals, etc.

EXAMPLES

The following Examples further illustrate the compositions described herein and recited in the claims.

Materials

POM-500: a general purpose non-impact modified POM resin with Mn of around 30,000 and melt flow rate of 15 g/10 minutes, measured at 190° C. using a 2.16 kg weight, available from DuPont under the trade name DELRIN® 500P.

POM-100: a general purpose non-impact modified POM resin with Mn of around 65,000 and melt flow rate of 2.5 g/10 minutes, measured at 190° C. using a 2.16 kg weight, available from DuPont under the trade name DELRIN® 100P.

Plexiglas® V920: a PMMA acrylic resin with Melt Flow Rate of 8.0 g/10 min, measured according to ASTM D1238 at 230° C. using a 3.8 kg weight.

Ultraform® E3320: terpolymer polyacetal available from BASF.

Denka Boron Nitride SP-3: fine particle boron nitride available from Denki Kagaku Kogyo.

Irganox® 1098: sterically hindered phenolic antioxidant, with molecular weight of 637 g/mol, available from Ciba.

Allantoin: having formula $C_4H_6N_4O_3$, available from International Specialty Products, Wayne N.J.

Equipment:

Extruder for Compounding: 30 mm co-rotating twin-screw extruder with mixing and melting zones, fitted with a 0.187 inch-diameter, 2-hole strand die, available from Coperion Corporation, Ramsey, N.J. USA.

Injection Molding: 6 ounce reciprocating screw injection molding unit, available from Nissei Corporation, Japan.

Test Methods

Related to the Imidized Acrylic [IA] Polymers

Two types of IA polymers were used in the study, both produced at "laboratory scale": "high acid" IA and "low acid" IA. As used herein, a high acid IA has an acid weight percent of 5 or greater and a low acid IA has an acid weight percent of 4 or less, preferably less than 1 weight percent. The following procedures were used to make the IAs:

A 25-mm diameter single screw extruder was used to melt and meter the starting resin into the 15-meter long, 12.5-mm diameter stainless steel transfer line tube. A polymer valve at the end of the transfer line was used to regulate the pressure in the transfer line. Downstream from the polymer valve was a 25-mm twin screw extruder with two vacuum vent ports used to remove excess amine and reaction byproducts prior to pumping the polymer through a strand die and cutting the strand into pellets. The amine source was injected into the polymer melt at the start of the transfer line using dual syringe pump system. After an IA was made and the volatiles were removed in the twin-screw extruder, the IA product contained carboxylic acid groups, anhydride groups, and some unreacted esters in addition to the imide groups. The initially-prepared IA may typically have 5 or more weight percent of acid groups. "Low Acid" versions of IA are produced by running the originally produced IA back into an extruder a second time and adding dimethyl carbonate to esterify the acid groups on the polymer chain.

The IA samples were made by reacting Plexiglas® V920 with monomethylamine using a screw speed on the single screw extruder of 50 rpms that was estimated to correspond to a PMMA resin feed rate of 97 g/minute and monomethylamine injection rate of 43 ml/minute. The oil temperature set-point for the jacket around the transfer line was 280° C., polymer melt temperature readings were 260° C. The pressure at the discharge to the polymer valve was controlled to 800 to 900 psig (5.5 to 6.2 mPa). The methyl amine injection pressure was recorded as 900 to 1200 psig (6.2 to 8.3 mPa). In the twin screw extruder the vacuum at the vent ports was recorded as being 17 in Hg or 58 kPa. The melt temperature of the polymer recorded at the pelletizing die of the twin screw extruder was 245° C. By DSC and nitrogen analysis it was determined the Tg was 163° C. and the nitrogen content was 7.5 weight percent. Several small batches run under the same nominal conditions were blended together to provide high acid IA's such as IA-HA-1. Low acid IA's (such as IA-LA-1) were made by re-extruding the dried high acid material (dried overnight at 100° C. set-point in a desiccant hopper dryer) made under the nominal conditions described above and treating with dimethyl carbonate. The single screw extruder screw speed was 74 rpm, estimated to correspond to a feed rate of about 140 g/min. The syringe pump was filled with dimethyl carbonate and injected into the transfer line at a rate of 14 ml/min to reduce the amount of acid present in the polymer. The set point on the oil heater heating the oil jacketing the transfer line was set to 280° C. The discharge pressure at the end of the transfer line was controlled to 250 to 440 psig (1.7 to 3 mPa). The syringe pump injection pressure was 640 to 880 psig (4.4 to 6 mPa). The melt temperature of high acid polymer recorded at the adapter between the single screw extruder and the transfer line was 270° C. The melt temperature of the low acid IA at the pelletizing die of the twin screw extruder was 235 to 265° C. By DSC and Nitrogen analysis it was determined the Tg of the low acid material was 151° C. and nitrogen content was 7.5 weight percent. Several small batches were blended together to provide low acid IA.

The aggregate blends of the small batches of imidized acrylics were reanalyzed, with the results summarized below in Table A.

Nitrogen number as a weight percent of nitrogen of the IA polymers was determined by a standard combustion method using a CHN analyzer, Carlo Erba Model 1108. The percent (by weight) imidization of the polymer was calculated based on the nitrogen number. The nitrogen number for a 100% imidized PMMA resin prepared using monomethyl amine is 8.4. As the molecular weight of the amine source goes up, the nitrogen number for 100% imidization goes down.

Weight percent of methacrylic acid in the IA polymers was determined by titration and calculating the amount of methacrylic acid from the molar amount of acid neutralized. The weight percent of ester groups can be calculated by subtracting the imide weight percent and the acid weight percent from 100. The amount of anhydride was assumed to be negligible, since anhydride could not be detected by IR.

Glass transition temperatures (Tg) of the IA polymers were determined by differential scanning calorimetry (DSC) according to ASTM D3418 (0-200° C.) with equilibration at 0° C., heating to 200° C., cooling to 0° C., and heating again to 200° C. at 10° C./min, with Tg recorded during the second heating.

TABLE A

|  | Nitrogen Number | % Imide | % Acid | Tg (° C.) |
|---|---|---|---|---|
| IA-HA-1 | 8.0 | 93 | 6.92 | 168 |
| IA-LA-1 | 7.8 | 93 | 0.5 | 155 |
| IA-HA-2 | 7.5 | 90 | 5.6 | 162 |
| IA-LA-2 | 7.7-7.8 | 92 | 0.38 | 152 |
| IA-LA-3 | 7.5 | 89 | 0.17 | 150 |

All components of the various samples below were initially dry blended in the required proportions and then fed into a twin-screw extruder to achieve a homogenously melt-mixed sample. Specifically, the IA samples were separately incorporated into either POM-500 or POM-100 by melt blending in an 18 mm Coperion twin-screw extruder. The IA and the POM ingredients were fed at the back of the extruder using two separate feeders. The IA pellets were dried at 100° C. for five hours before blending. A relatively strong screw design was used to provide the desired amount of shear and mixing. Upon exiting the extruder die, the emerging strand was quenched in a water bath and then cut into pellets of 3 mm length with a conventional strand cutter. The pellets were then dried at 80° C. overnight, followed by injection molding to form test bars on a 1.5-ounce Arburg injection molding machine.

The compounding and the injection molding processes were smooth without difficulties, except test bars prepared from the neat IA polymers were very brittle.

Mechanical and thermal tests were performed using ASTM test methods. Flexural modulus was determined according to ASTM D-790. Notched Izod impact strength was determined according to ASTM D-256. Charpy Impact strength was determined according to ISO179 at 23° C. The Vicat temperature was determined according to ASTM D1525, with temperature increase rate of 2.0° C./minute, 10 Newton force and penetration of 1 mm. Heat deflection temperature (HDT) was determined in each case at 264 psi (1.8 MPa) according to ASTM D-648. Dynamic Mechanical Analyses (DMA) were conducted to assess modulus increase at elevated temperature, and upper use temperature increase at a constant stiffness.

Table 1 shows the heat deflection temperature for blends of POM-500 and high acid and low acid IAs.

TABLE 1

| Example | POM-500 (weight %) | IA (weight %) | HDT (° C.) | Std. Dev. | HDT Change (° C.) |
|---|---|---|---|---|---|
| C1 | 100 | — (0) | 99 | 1 | 0 |
| C2 | 95 | IA-HA-1 (5) | 97.8 |  | −1.2 |
| 1 | 95 | IA-LA-1 (5) | 101.8 |  | +2.8 |

At 5 weight percent of IA-HA-1 (high acid) in POM-500 (Comparative Example C2), the HDT decreased somewhat compared to neat POM-500. With the low acid IA-LA-1, the HDT increased, but only slightly.

Table 2 shows the heat deflection temperature for a series of blends of POM-100 and various IAs. Since IA-LA-1 was very brittle, test plaques for HDT testing could not be made; the HDT of IA-LA-1 was estimated based on its Tg.

TABLE 2

| Example | IA | wt % | °C. | Std. Dev. | Increase (°C.) | Increase (%) |
|---|---|---|---|---|---|---|
| C3 | | 0 | 97.6 (ave. of 4 samples) | 1 | NA | NA |
| C4 | IA-LA-1 | 100 | 145-150 (estimate) | | NA | NA |
| 2 | IA-LA-1 | 1.25 | 105.7 | 0.6 | 8 | 8 |
| 3 | IA-LA-1 | 2.5 | 123.7 | 0.6 | 26 | 27 |
| 4 | IA-LA-1 | 3.75 | 116.3 | 1.5 | 19 | 19 |
| 5 | IA-LA-1 | 5 | 128.3 | 3.5 | 31 | 31 |
| 6 | IA-LA-1 | 6.25 | 124 | 1 | 26 | 27 |
| 7 | IA-LA-1 | 7.5 | 123.7 | 1.5 | 26 | 27 |
| C5 | IA-HA-2 | 5 | 101.5 | | 4 | 4 |
| 8 | IA-LA-2 | 5 | 126 | | 28.4 | 29 |
| 9 | IA-LA-3 | 5 | 120 | | 22.4 | 23 |
| C6 | IA-LA-3 | 10 | 123.3 | | 25.7 | 26 |
| C7 | IA-LA-3 | 15 | 123 | | 25.4 | 26 |
| C8 | IA-LA-3 | 20 | 124 | | 26.4 | 27 |
| C9 | IA-LA-3 | 25 | 123 | | 25.4 | 26 |
| C10 | IA-LA-3 | 40 | 124.5 | | 28.4 | 29 |

The HDT of POM-100 modified with 5 weight percent of the high acid IA-HA-2 showed only small improvement (Comparative Example C5 compared to Comparative Example C3). However, for examples with low acid IA-LA-1 at up to about 5 weight percent, the HDT increased significantly. With low acid IA loading from about 1 to about 8 weight percent, based on the combination of POM and IA, the HDT increased from about 5% to about 35% compared to the neat POM compositions.

As summarized in Table 2, blending in only 2.5 weight percent and 5 weight percent of a low acid IA increased the HDT from 97.6° C. of the control sample to 124° C. and 128° C., respectively; that is, an increase of 26° C. and 31° C., or 27% and 31%, respectively. Examples up to about 8 weight percent of low acid IA showed no additional improvement.

A similar increase in HDT was observed when IA-LA-2 was used at 5 weight percent loading. A series of samples using IA-LA-3 showed that maximum increase in HDT was achieved between 5 and 10 weight percent IA loading. The HDT of samples with amounts from 10 to 40 weight percent of IA-LA-3 was essentially the same (Comparative Examples C6 to C10). The weight percent of imide in IA-LA-3 was less than that in IA-LA-1, as was its Tg. Without being bound by any particular theory, these factors may account for the lower HDT observed at the 5 weight percent loading level for IA-LA-3.

Generally, the results in Table 2 demonstrate an extraordinary and surprising improvement in the heat resistance of the POM compositions described herein because of the incorporation of only a small amount of IA, particularly low acid IAs. Although the HDT increased for IA loadings from about 1 to about 40 weight percent; the effect is most apparent for loadings of 1 to 8 weight percent, especially from about 2 to about 5 weight percent. The increase in HDT achieved by adding from about 8 to about 40 weight percent IA was not particularly significant. Above about 40 weight percent IA, and particularly at 50 to 100 weight percent IA, the continuous phase in the blend is likely to change from POM to IA, which in turn will change the main properties of the blend. Specifically, as the blend becomes more IA, the HDT is likely to increase again up to the HDT of pure IA. IA samples with acid levels above about 2 weight percent showed much less HDT increase than the 5 weight percent level.

A comparison of Examples 1 and 5 shows that adding low acid IA to low molecular weight POM-500 did not result in as significant an improvement as when a similar low acid IA was added to high molecular weight POM-100.

Stiffness of the POM-100 also increased with the addition of about 1 weight percent to about 8 weight percent. Tables 3 and 4 show that, for the range of 2.5 to 7.5 weight percent of IA, both flexural modulus (under large strain) and secant modulus (under small strain) at room temperature increased about 30 percent. Above about 8 weight percent to about 40 weight percent of IA, there was little additional improvement in flexural modulus.

TABLE 3

| | | | Flex Modulus at 23 °C. | | | Stress at 5% strain | | |
|---|---|---|---|---|---|---|---|---|
| | IA | IA Loading (weight %) | MPa | Std. Dev. | Increase (%) | MPa | Std. Dev. | Increase (%) |
| C3 | — | 0 | 2829 | 203.1 | NA | 92.6 | 3.8 | NA |
| 2 | IA-LA-1 | 1.25 | 3473 | 67.3 | 23 | 112.4 | 1.19 | 21 |
| 3 | IA-LA-1 | 2.5 | 3637 | 83.2 | 29 | 119.0 | 1.51 | 29 |
| 4 | IA-LA-1 | 3.75 | 3643 | 84.1 | 29 | 120.6 | 1.57 | 30 |
| 5 | IA-LA-1 | 5 | 3689 | 98.6 | 30 | 122.6 | 1.96 | 32 |
| 6 | IA-LA-1 | 6.25 | 3689 | 77.9 | 30 | 122.8 | 1.54 | 33 |
| 7 | IA-LA-1 | 7.5 | 3782 | 67.2 | 34 | 125.2 | 0.98 | 35 |
| C8 | IA-LA-3 | 20 | 3728 | 98.1 | 32 | | | |
| C10 | IA-LA-3 | 40 | 3967 | 98.3 | 40 | | | |

TABLE 4

| | IA | IA Loading (weight %) | Secant Modulus at 23° C. MPa | Std. Dev. | Increase (%) |
|---|---|---|---|---|---|
| C3 | — | 0 | 3135 | 61 | NA |
| 2 | IA-LA-1 | 1.25 | 3376 | 75 | 8 |
| 3 | IA-LA-1 | 2.5 | 3477 | 152 | 11 |
| 4 | IA-LA-1 | 3.75 | 3542 | 66 | 13 |
| 5 | IA-LA-1 | 5 | 3593 | 192 | 15 |
| 6 | IA-LA-1 | 6.25 | 3687 | 189 | 18 |
| 7 | IA-LA-1 | 7.5 | 3823 | 104 | 22 |

Adding the IA did not adversely affect the tensile strength. To the contrary, Table 5 shows that tensile strength increased slightly up to 5 weight percent of IA. Although Table 5 shows a low level of elongation reduction, the results indicate that the samples still maintain reasonably good ductility to satisfy the end use requirement. In particular, samples with 20 weight percent or greater of IA showed no yield in these tensile tests, with significantly reduced strain at break.

TABLE 5

| | IA Loading | Tensile Strength at yield | | Break Strength | | Strain at Break | |
|---|---|---|---|---|---|---|---|
| IA | (weight %) | MPa | Std. Dev. | MPa | Std. Dev. | % | Std. Dev. |
| C3 | — | 0 | 67.7 | 0.4 | 70.9 | 1.4 | 35.7 | 4.0 |
| 2 | IA-LA-1 | 1.25 | 76.1 | 0.5 | 70.9 | 0.9 | 36.8 | 4.0 |
| 3 | IA-LA-1 | 2.5 | 77 | 0.4 | 71.1 | 0.5 | 31.8 | 2.7 |
| 4 | IA-LA-1 | 3.75 | 78.1 | 0.6 | 72.1 | 1.5 | 33.1 | 5.6 |
| 5 | IA-LA-1 | 5 | 78.1 | 0.5 | 73.3 | 1.7 | 27.6 | 5.0 |
| 6 | IA-LA-1 | 6.25 | 77.8 | 0.4 | 72.2 | 1.4 | 31.6 | 4.8 |
| 7 | IA-LA-1 | 7.5 | 77.7 | 0.4 | 72.4 | 0.6 | 27.5 | 2.1 |
| C8 | IA-LA-3 | 20 | 70.74* | 0.76 | 70.74 | 0.76 | 3.17 | 0.08 |
| C10 | IA-LA-3 | 40 | 55.88* | 1.52 | 55.88 | 1.52 | 1.69 | 0.12 |

*Tensile Strength at break (no yield observed)

Dynamic Mechanical Analyses (DMA) results showed significant increases in storage modulus (stiffness). Storage modulus E' represents the elastic component of the modulus of the material as opposed to the viscous component. Table 6 shows that Example 5, for the range of temperatures of 70° C., 80° C., 90° C., and 100° C., and with 5 weight percent of IA, had a range of increase in storage modulus from 24 percent to 34 percent of that of the control at the same testing temperatures. Samples having a range from 5 to 8 weight percent IA showed little additional improvement.

TABLE 6

| Example | IA Loading (weight %) | at 70° C. | at 80° C. | at 90° C. | at 100° C. |
|---|---|---|---|---|---|
| C3 | 0 | 1732 | 1502 | 1310 | 1136 |
| 2 | 1.25 | 1960 | 1721 | 1518 | 1334 |
| 3 | 2.5 | 2031 | 1791 | 1586 | 1399 |
| 4 | 3.75 | 2046 | 1815 | 1614 | 1428 |
| 5 | 5 | 2150 | 1918 | 1713 | 1526 |
| 6 | 6.25 | 2185 | 1948 | 1745 | 1563 |
| 7 | 7.5 | 2173 | 1952 | 1758 | 1578 |

Table 7 shows that for the IA modified blends compared with glass-reinforced POM-100 (C11): (1) elongation percent was retained; and (2) reduction in Charpy impact was less.

TABLE 7

| Example | IA Loading (weight %) | Elongation % | Charpy Impact (KJ/m$^2$) |
|---|---|---|---|
| C3 | 0 | 35.7 | 14.0 |
| 2 | 1.25 | 36.8 | |
| 3 | 2.5 | 33.1 | 6.6 |
| 4 | 3.75 | 31.8 | |
| 5 | 5 | 27.6 | 6.0 |
| 6 | 6.25 | 31.6 | |
| 7 | 7.5 | 27.5 | |
| C11 | 10 weight % glass fiber | 4 | 5 |

Table 8 shows that in a long-term high temperature creep test run at 90° C. for 60 minutes with 2 MPa force, POM compositions comprising POM-100 modified with 2.5 and 5 weight percent of IA, experienced a reduction in creep of about 20 weight percent compared to unmodified POM.

TABLE 8

| Example | IA Loading (weight percent) | Creep Compliance (1/MPa) |
|---|---|---|
| C3 | 0 | $3.26 \times 10^{-3}$ |
| 3 | 2.5 | $2.64 \times 10^{-3}$ |
| 5 | 5 | $2.6 \times 10^{-3}$ |

Table 9 depicts that Thermal Gravimetric Analysis [TGA] on test samples showed that inclusion of IA in POM compositions described herein resulted in their improved thermal stability. Molded sample test bars were heated in a nitrogen atmosphere from 30 to 230° C. at 10° C./minute, followed by a 60-minute hold at 230° C. Infrared spectroscopy was used to detect the evolved gases during the temperature ramp-up. Off-gassed material was collected and analyzed for evolution of formaldehyde for the entire heating period. Table 9 shows TGA results of lower total weight loss and lower formaldehyde evolution for the samples compared to neat POM.

TABLE 9

| Example | IA Loading (weight %) | Formaldehyde evolved (mg/g of sample) | Total Weight loss (%) |
|---|---|---|---|
| C3 | 0 | 73.8 | 6.1 |
| 3 | 2.5 | 33.1 | 3.6 |
| 5 | 5 | 20.1 | 2.2 |

Table 10 shows the results of testing for the improvement in creep resistance of additional POM compositions described herein. Creep resistance is an equivalent term to time to X % creep strain. All components of the samples in Table 10 were initially dry blended in the required proportions and then fed into a twin-screw extruder to achieve a homogeneously melt-mixed sample. A barrel temperature of 200° C. to 210° C. and a throughput of 30 lb/hr at 150 rpm was used to compound the composition. The resultant molten extrudate was quenched in a water bath at 25° C. and pelletized into cylindrical pellets, approximately 0.25 in [1 cm] long and 0.125 in [0.5 cm] diameter. The pellets were then dried for 4 hr at 80° C. under vacuum.

After drying, the pellets were fed into the injection molding unit, the barrels of which were heated to 200° C. to 210° C. The mold was heated to 90° C. An insert mold in the shape prescribed in ISO 527-2/1A was used. The resulting specimens were equilibrated at 23° C., 50% relative humidity for 48 hr prior to testing.

Tensile creep tests were carried out according to ISO 899-1. Tensile creep tests were performed at 90° C. and an initial stress of 25 MPa. Tensile strain of the samples was measured using an extensometer. All samples were strained to approximately 10% tensile strain.

In Table 10, C-12, C-13, and C-14 are comparative examples and Ex-8 and Ex-9 are examples of the POM compositions described herein. Table 10 shows that Example 8 with 2.5 weight percent low acid IA experienced a dramatic, 208% increase in creep resistance, reported here as time to 5% creep strain, over that of C-14, a POM composition having high molecular weight POM but no IA and with 0.1 weight percent boron nitride SP-3 and 0.05 weight percent allantoin. The specific results were: 720 sec (for C-14) vs. 2220 sec (for Ex-8). Example 9 with a 5 weight percent low IA exhibited an even more dramatic increase of 300% in creep resistance over that of C-14. Importantly, C-14 was the comparative example with the highest creep resistance of the three comparatives tested, likely due to the boron nitride and allantoin additions. Therefore, comparison of the Examples Ex-8 and Ex-9 with C-14 illustrates the smallest improvement in creep resistance.

To the point, a comparison of the time to 5% creep strain of Ex-8 to that of C-12 shows an increase of 1750%, that is, an increase in seconds from 120 to 2220. Ex-9 relative to C-12 experienced 2450% increase in the time to 5% creep, that is, an increase in seconds from 120 to 3060.

Similarly spectacular results were achieved in comparing the time to 5% creep strain of Ex-8 and Ex-9 with that of C-13. The C-13 comprised 2 weight percent Ultraform® 3320, reported to have an HDT of 105° C., which is likely to have raised its creep resistance compared to C-12. Ex-8 had an increase in seconds from 240 to 2220 sec, an increase of 825%. Ex-9 had an increase in seconds from 240 to 3060 sec, an increase of 1175%.

Creep resistance may also be measured as time to 7% creep to strain. When that measure of creep resistance is used, the improvement for Ex-8 and Ex-9 relative to C-12 is 1463% and 2000%, respectively. Relative to C-13, the increase of time to 7% creep to strain for Ex-8 and Ex-9 is 681% and 950%, respectively. Relative to C-14, the increase of time to 7% creep to strain for Ex-8 and Ex-9 is 191% and 291%, respectively.

TABLE 10

| Example | C-12 | C-13 | C-14 | Ex-8 | Ex-9 |
|---|---|---|---|---|---|
| Composition in weight percent | | | | | |
| Delrin ® 100 Fluff | 99.375 | 97.375 | 99.225 | 96.875 | 94.375 |
| MAP 1070 | 0.475 | 0.475 | 0.475 | 0.475 | 0.475 |
| Irganox ® 1098 | 0.150 | 0.15 | 0.15 | 0.15 | 0.15 |
| Ultraform ® E3320 | | 2.000 | | | |
| Boron Nitride SP-3 | | | 0.1 | | |
| Allantoin | | | 0.05 | | |
| IA-LA | | | 0 | 2.5 | 5 |
| Total | 100.00 | 100.0 | 100.0 | 100.0 | 100.0 |
| Time to 5% Creep Strain [s] ISO 899-1 | 120 | 240 | 720 | 2220 | 3060 |
| Time to 7% Creep Strain [s] ISO 899-1 | 480 | 960 | 2580 | 7500 | 10080 |
| HDT [° C.] ISO 75-1/-2 [1.8 MPa] | 93 | 99 | 100 | 120 | 121 |

We claim:

1. A thermoplastic composition comprising:
   (a) 92 to 99 weight percent, based on the combined weight of (a) and (b), of polyoxymethylene with number average molecular weight from 20,000 to 250,000 g/mole; and
   (b) about 1 to about 8 weight percent, based on the combined weight of (a) and (b), of an imidized acrylic resin obtained by treating an acrylic polymer with a monoalkyl amine wherein the monoalkyl group has from one to five carbon atoms, the degree of imidization is 20% to 100% and the acid level is from 0 to 2 weight percent of the imidized acrylic resin.

2. The composition of claim 1 wherein the imidized acrylic resin comprises cyclic imide units.

3. The composition of claim 1 wherein the imidized acrylic resin is obtained by treating an acrylic polymer with methylamine.

4. The composition of claim 1 wherein the imidized acrylic resin is obtained by treating poly(methyl methacrylate) with methylamine.

5. The composition of claim 1 wherein the imidized acrylic resin is present in the composition in an amount from 1 to 5 weight percent.

6. The composition of claim 1 wherein the polyoxymethylene has a number average molecular weight from 50,000 to 100,000 g/mole.

7. The composition of claim 6 wherein the polyoxymethylene has a number average molecular weight from 50,000 to 80,000 g/mole.

8. The composition of claim 1 wherein the acrylic polymer is poly(methyl methacrylate), poly(methyl acrylate), or a copolymer of methyl methacrylate or methyl acrylate and at least one additional comonomer selected from styrene, acrylonitrile, vinyl acetate, ethylene, butadiene or methyl vinyl ether.

9. The composition of claim 8 wherein the acrylic polymer is poly(methyl methacrylate).

10. The composition of claim 1 wherein the degree of imidization is from 60% to 100%.

11. The composition of claim 10 wherein the degree of imidization is from 80% to 100%.

12. The composition of claim 11 wherein the degree of imidization is from 90% to 100%.

13. An article comprising the composition of claim 1 having a heat deflection temperature determined according to ASTM D-648 that exceeds that of a comparison standard article wherein the shaped article and the comparison standard article have the same shape and structure with the exception that the comparison standard article is prepared from a polyoxymethylene composition that does not comprise an imidized acrylic resin.

14. The article of claim 13 wherein the composition comprises a polyoxymethylene having a number average molecular weight from 50,000 to 100,000 g/mole.

15. The article of claim 13 wherein the imidized acrylic resin is obtained by treating an acrylic polymer with methylamine and the acrylic polymer is poly(methyl methacrylate), poly(methyl acrylate), or a copolymer of methyl methacrylate or methyl acrylate and at least one additional comonomer selected from styrene, acrylonitrile, vinyl acetate, ethylene, butadiene or methyl vinyl ether.

16. The article of claim 15 wherein the imidized acrylic resin is obtained by treating poly(methyl methacrylate) with methylamine.

17. The article of claim 15 wherein the degree of imidization is from 80A % to 100%.

18. The article of claim 13 that is in the form of sheet, profile, rod stock, film, filament, fiber, strapping, tape, tubing, or pipe.

19. The article of claim 13 that is a machine or engine part.

20. A method for preparing a shaped article comprising a composition, the method comprising (1) melt blending a first polyoxymethylene composition, wherein the first polyoxymethylene has a number average molecular weight from 20,000 to 250,000 g/mole, with an imidized acrylic resin, wherein the imidized acrylic resin is obtained by treating an acrylic polymer with a monoalkyl amine wherein the monoalkyl group has from one to five carbon atoms, the degree of imidization is 20% to 100% and the acid level is from 0 to about 2 weight percent of the imidized acrylic resin to provide a molten thermoplastic composition;

(2) forming the molten composition into a desired shape, and (3) cooling the molten composition to provide a shaped article;

wherein the shaped article has a heat deflection temperature determined according to ASTM D-648 that exceeds that of a comparison standard article wherein the shaped article and the comparison standard article have the same shape and structure with the exception that the comparison standard article is prepared from the first polyoxymethylene composition that does not comprise an imidized acrylic resin.

* * * * *